Figure 1:
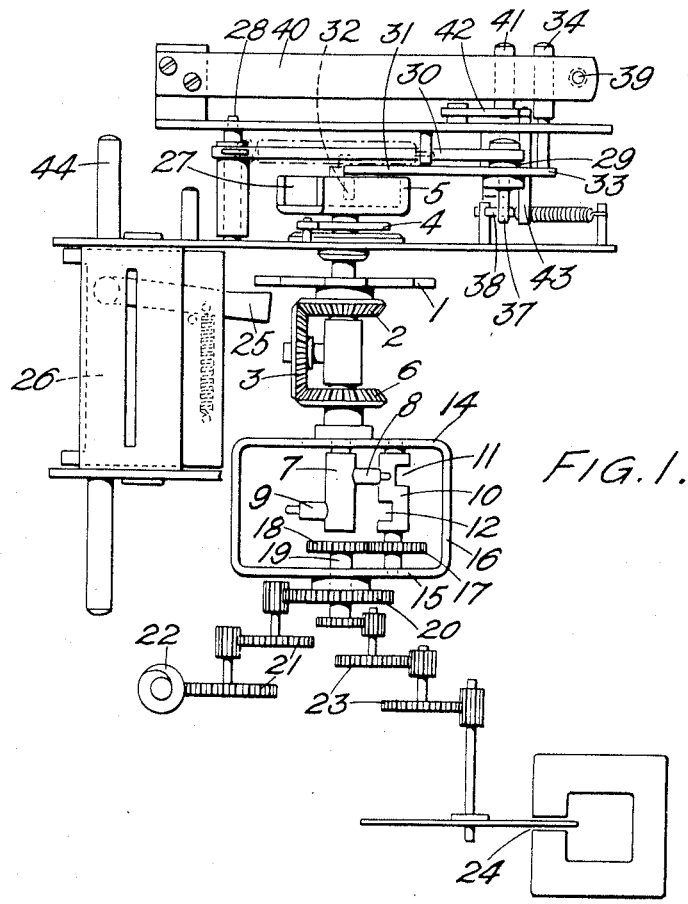

June 12, 1934.   R. C. GRASEBY   1,962,391
PREPAYMENT METER MECHANISM
Filed Jan. 4, 1934

Inventor
Robert C. Graseby
Per, Symons & Fraser

Patented June 12, 1934

1,962,391

UNITED STATES PATENT OFFICE 1,962,391

PREPAYMENT METER MECHANISM

Robert Constantine Graseby, New Malden, England

Application January 4, 1934, Serial No. 705,294
In Great Britain January 12, 1933

7 Claims. (Cl. 194—11)

This invention relates to prepayment meter mechanism having means whereby a standing charge, such as may be payable in respect of the installation with which the meter is used, for example, a rent for the meter, may be collected.

Prepayment meter mechanism to which the present invention relates is of the kind (hereinafter referred to as the kind specified) which comprises (a) controlling means for a supply, (b) prepayment mechanism to operate the controlling means and including a portion that is coin-operated to set another portion of the prepayment mechanism, (c) driving means which acts to return the other portion of the prepayment mechanism towards a zero position where it causes the controlling means to cut off the supply, for example a spring which is wound when the coin-operated portion of the mechanism is operated, (d) connections between the prepayment mechanism and the meter motor comprising a control barrel driven by said motor and having a flat or groove, and a flier comprising a spindle driven by the driving means of the other portion of the prepayment mechanism and a pin or arm to engage the barrel and to be held up thereby and to be released by passing over the flat or through the groove, and (e) other motor mechanism, for example a spring-driven or electrically-driven motor mechanism (hereinafter referred to for convenience of description as a time motor) which permits said other portion of the prepayment mechanism to be driven to return it towards its zero position. The said other motor mechanism (time motor) constitutes the means whereby the standing charge is collected.

The present invention comprises prepayment meter mechanism of the kind specified wherein the flier is adapted to be released from its control (barrel) either by rotation of the control on its own axis or by bodily translational movement through space of the control or by both simultaneously, and wherein a meter motor and a time motor are each connected to the control, the one to rotate it on its own axis and the other to give it or permit it to have bodily translational movement, and each motor is adapted to operate independently of the other.

The present invention also comprises prepayment meter mechanism of the kind specified wherein the flier is connected to a differential gear, the control (barrel) is mounted for rotation on a carrier which is itself mounted to rotate about an axis coincident with the axis of the flier and the axis of a shaft to which the control is geared, and wherein the said shaft and the said carrier are each controlled, the one by the meter motor and the other by the time motor.

The prepayment mechanism according to the present invention is particularly, though not exclusively applicable for controlling the supply of electrical energy.

Figure 2:
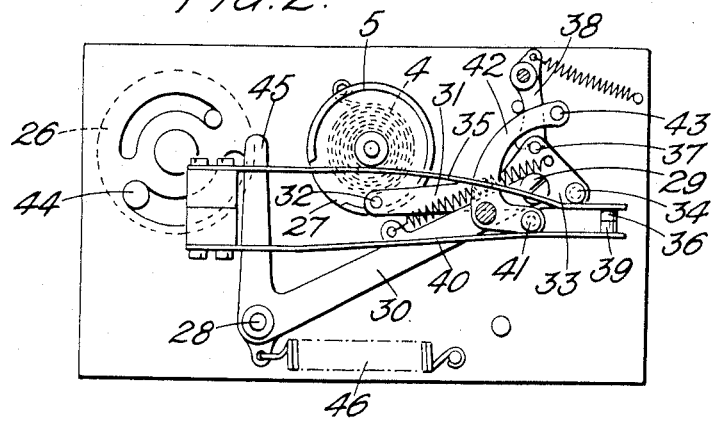

One form of prepayment meter mechanism according to the present invention will now be described by way of example and with reference to the accompanying drawing, wherein Fig. 1 shows diagrammatically the application of the invention to a prepayment meter for electrical energy, and Fig. 2 a plan of the switch operating mechanism.

The prepayment mechanism includes a star wheel 1 which is rotated by the engagement of an arm or projection 25 on the coin drum 26 when a coin is inserted in said drum and the latter is rotated. The star wheel 1 is fixed to one sun wheel 2 of a differential gear whose planet wheel 3 is connected to the other portions of the prepayment mechanism. The said other portion of the prepayment mechanism has driving means comprising a spring 4 which is wound when the coin-operated portion of the mechanism is operated, i. e. when the star wheel 1 is rotated, and which tends to drive the other portion of the prepayment mechanism reversely towards a zero position where it causes the controlling means to cut off the supply. The said other portion of the mechanism comprises a disc having an upstanding rim 5 with a gap 27 therein. A first lever pivoted at 28 carries pivotally at 29 at the end of one arm 30 a floating lever whose one arm 31 carries a retaining pin 32 normally disposed within the rim 5 and which will move through the gap 27 therein. The other arm 33 of the floating lever carries an upstanding pin 34 which engages a first spring switch arm 35 carrying a first contact 36. The floating lever also has an extension which carries an additional pin 37 adjacent its pivot 29 which engages a spring controlled retaining catch 38. A second contact 39 is carried on a second spring switch arm 40 which is engaged by a pin 41 on one arm of a further lever 42 whose other arm carries a downwardly depending pin 43 which lies in the path of the retaining catch 38. The contacts 36, 39 are the contacts of the switch or controlling means for the supply of electrical energy.

The other sun wheel 6 of the differential is fixed to the spindle 7 of a flier which spindle has a pair of arms 8, 9 extending outwards in opposite directions at different points of its length. A barrel 10 having two flats or grooves 11, 12 at opposite sides of the centre line and spaced axially at the same distance as the arms 8, 9 of the flier spindle is arranged parallel to the spindle. The barrel is mounted on a shaft carried for rotation in the opposite plates 14, 15 of a cage 16 and the flier spindle 7 passes centrally and rotatably through the plate 14. The barrel shaft has fixed to it a gear wheel 17 which meshes with an exactly similar gear wheel 18 fixed on a shaft 19 which passes centrally and rotatably through the other plate 15 of the cage so that it is co-axial with the flier spindle 7. The cage has fixed to it a gear wheel 20 by which it is connected through gearing 21 to a time motor 22; the gear wheel 20 is co-axial with the shaft 19. The shaft 19 is driven by the meter motor 24 to which it is connected through gearing 23.

The operation of the mechanism is as follows. A coin having been inserted in the drum 26, the latter is rotated whereby the arm 25 causes the star wheel 1 to be rotated and the spring 4 to be wound up. The rim 5 is at the same time moved to a position such that the retaining pin 32 is held within it and the first lever is moved to close the switch contacts 36, 39. This is effected as follows:—The drum 26 carries a pin 44 which, when the drum is rotated engages the arm 45 of the first lever. The retaining pin 32 on the floating lever bears on the inside of the rim 5 and thus the floating lever moves with the first lever about the pin 32 against the spring 46. The upstanding pin 34 moves the first spring switch arm 35 towards the second spring switch arm 40. During this movement the additional pin 37 on the floating lever moves the retaining catch 38 against its spring and thus causes the lever 42 to move and the pin 41 on it to move the second switch arm 40 in the same direction as the first switch arm 35. This continues until the pin 37 on the floating lever moves beyond the end of the catch 38 (to the position shown in Fig. 2) when the latter is released and returns to its original position under the action of its spring. The lever 42 is then free and the second switch arm 41 moves quickly towards the first switch arm 35 to close the switch and the retaining catch 38 holds it closed. The switch is shown in the closed position in the drawing.

Assume the time motor 22 to be stationary. The motor mechanism 24 of the meter operates to rotate the shaft 19 and thus also the barrel 10 which is geared to it. The flier spindle 7 is then able to rotate under the action of the spring 4 and the other portion 5 of the prepayment mechanism is thereby returned towards the zero position at which the controlling means cuts off the supply when the quantity has been supplied for which payment has been made. Assume now the time motor 22 to be operating and the meter motor 24 to be stationary. In these circumstances the cage 16 which constitutes a carrier for the barrel 10 is rotated by the pressure of an arm 8 or 9 on the barrel 10 about the shaft 19 and also about the flier spindle 7, the flier driven by the spring 4, following the barrel 10 round. At the same time due to the fact that the barrel is geared to the shaft 19 it also rotates and allows the flier spindle 7 to move still further. Thus the operation of the time motor 22 also permits the other portion 5 of the prepayment mechanism to return towards the zero position under the action of the spring 4. In practice the time motor 22 and the meter motor 24 are usually operating simultaneously to permit the spring 4 to drive the other portion 5 of the prepayment mechanism towards the zero position.

It will be understood that the meter motor 24 may control the cage 16 and the time motor 22 may drive the shaft 19.

When the rim 5 is returned to its zero position the pin 32 can move out through the gap 27. The switch then opens under the action of the springiness of the arm 35 or of another spring embodied in the mechanism.

The arrangement might be such that the carrier is rotated by the time motor in a direction which would turn the flier to wind the spring 4 while the arm of the flier bears against the control; the flier turning in the opposite direction when the control reaches positions to release it. It will be understood that in any such arrangement the gearing of the control to the spindle 19 must be such that the flier is released frequently enough to permit the other portion 5 of the prepayment mechanism to be returned towards the zero position.

What I claim is:—

1. Prepayment meter mechanism comprising a control device for a supply, coin operated means to operate the control device to permit a supply, means to hold the control device in a position permitting a supply, a driving connection between said means and the coin operated means, a flier operatively connected to the means which holds the control device, driving means for the flier to permit the means which holds the control device to return to a zero position to release the control device to cut off the supply, a control barrel which holds up and releases the flier, a meter motor, and a time motor both connected to the control barrel the one to rotate it and the other to cause bodily translational movement thereof.

2. Prepayment meter mechanism comprising a control device for a supply, coin operated means to operate the control device to permit a supply, means to hold the control device in a position permitting a supply, a driving connection between said means and the coin operated means, a flier operatively connected to the means which holds the control device, driving means for the flier to permit the means which holds the control device to return to a zero position to release the control device to cut off the supply, a carrier mounted to rotate about an axis coincident with the axis of the flier, a control barrel which holds up and releases the flier mounted for rotation on the carrier, a shaft to which the control barrel is geared said shaft being coaxial with the flier, a meter motor and a time motor the one connected to the carrier and the other to the shaft to which the control barrel is geared.

3. Prepayment meter mechanism comprising a control device for a supply, coin operated means to operate the control device to permit a supply, means to hold the control device in a position permitting a supply, a driving connection between said means and the coin operated means, a flier operatively connected to the means which holds the control device, driving means for the flier to permit the means which holds the control device to return to a zero position to release the control device to cut off the supply, a carrier having two opposite plates mounted to rotate about an axis coincident with the axis of the flier, a control barrel which holds up and releases the flier mounted for rotation between the two plates, a shaft to which the control barrel is geared said shaft being coaxial with the flier, a meter motor and a time motor the one connected to the carried and the other to the shaft to which the control barrel is geared.

4. Electric prepayment meter mechanism comprising a switch to control the supply of electric current, coin operated means to close the switch, means to hold the switch closed, a driving connection between said means and the coin operated means, a flier operatively connected to the means which holds the switch closed, driving means for the flier to permit the means which holds the switch closed to return to a zero position to cause the switch to open, a control barrel which holds up and releases the flier, a meter motor, and a time motor both connected to the control barrel the one to rotate it and the other to cause bodily translational movement thereof.

5. Electric prepayment meter mechanism comprising a switch to control the supply of electric current, coin operated means to close the switch, means to hold the switch closed, a driving connection between said means and the coin operated means, a flier operatively connected to the means which holds the switch closed, driving means for the flier to permit the means which holds the switch closed to return to a zero position to cause the switch to open, a carrier mounted to rotate about an axis coincident with the axis of the flier, a control barrel which holds up and releases the flier mounted for rotation on the carrier, a shaft to which the control barrel is geared said shaft being coaxial with the flier, a meter motor and a time motor the one connected to the carrier and the other to the shaft to which the control barrel is geared.

6. Electric prepayment meter mechanism comprising a switch to control the supply of electric current, coin operated means to close the switch, means to hold the switch closed, a driving connection between said means and the coin operated means, a flier operatively connected to the means which holds the switch closed, driving means for the flier to permit the means which holds the switch closed to return to a zero position to cause the switch to open, a carrier having two opposite plates mounted to rotate about an axis coincident with the axis of the flier, a control barrel which holds up and releases the flier mounted for rotation between the two plates, a shaft to which the control barrel is geared said shaft being coaxial with the flier, a meter motor and a time motor the one connected to the carrier and the other to the shaft to which the control barrel is geared.

7. Electric prepayment meter mechanism comprising a switch to control the supply of electric current, coin-operated means to close the switch, means to hold the switch closed, a differential gear whereof one sun wheel is connected to the coin-operated means and the planet wheel is connected to the means to hold the switch closed, a flier connected to the other sun wheel of said differential, spring driving means connected to the planet wheel of the differential to drive the means which holds the switch closed towards a zero position to cause the switch to open, a carrier mounted to rotate about an axis coincident with the axis of the flier, a control barrel which holds up and releases the flier mounted for rotation on the carrier, a shaft to which the control barrel is geared, said shaft being coaxial with the flier, a meter motor and a time motor, the one connected to the carrier and the other to the shaft to which the control barrel is geared.

ROBERT CONSTANTINE GRASEBY.